United States Patent [19]

Mashimo et al.

[11] Patent Number: 4,458,999

[45] Date of Patent: Jul. 10, 1984

[54] MOTOR DRIVE DEVICE

[75] Inventors: Yukio Mashimo, Kanagawa; Tomonori Iwashita, Tokyo, both of Japan

[73] Assignee: Canon Kabushiki Kaisha

[21] Appl. No.: 382,243

[22] Filed: May 26, 1982

[30] Foreign Application Priority Data

Jun. 4, 1981 [JP] Japan .................................. 56-86143

[51] Int. Cl.³ ............................................. G03B 1/18
[52] U.S. Cl. ................................ 354/173.11; 354/214; 354/268
[58] Field of Search ............... 354/173, 234, 235, 214, 354/267, 268, 171

[56] References Cited

U.S. PATENT DOCUMENTS

| 4,126,877 | 11/1978 | Ohtaki et al. ................... 354/267 X |
| 4,304,481 | 12/1981 | Ichiyanagi .......................... 354/173 |
| 4,306,794 | 12/1981 | Fukahori et al. .................. 354/173 |
| 4,340,289 | 7/1982 | Maida .................................... 354/173 |
| 4,379,629 | 4/1983 | Daitoku .............................. 354/173 |

Primary Examiner—William B. Perkey
Attorney, Agent, or Firm—Toren, McGeady and Stanger

[57] ABSTRACT

In the disclosed system a camera includes an electromagnetic release circuit which when operated starts an exposure. A motor-drive includes a drive circuit for winding and rewinding film. The electro-magnetic release circuit is disabled during the film rewind operation to prevent the effect of accidental release.

1 Claim, 2 Drawing Figures

//MOTOR DRIVE DEVICE

BACKGROUND OF THE INVENTION

1. Field of the Invention

This invention relates to camera systems, and particularly to safety devices for electro-magnetic release type cameras using motor drives.

2. Description of the Prior Art

Such a camera stops the film winding operation automatically by opening a switch which engages a film counter, or by electrically or mechanically responding to the resistance to winding when the loaded film has been completely used. The automatic stop arrangement operates when the photographic action is finished or when the film is being wound. Thus the shutter is not released even if the shutter button is depressed. However, if all frames have already been exposed and the electro-magnetic rewind starts before the automatic stop arrangement operates, accidentally depressing the shutter button, inadvertently starts a release operation which opens the shutter and unintentionally exposes the film. Thus, if the film is being rewound after all frames have been exposed, releasing the shutter button may expose the film and produce undesirable results.

SUMMARY OF THE INVENTION

It is an object of the present invention to provide a safety device for preventing the erroneous exposure during the film rewinding.

It is another object of the present invention to provide a prohibiting means for prohibiting the operation of the electromagnetic release circuit when the motor drive device is in the rewinding mode so as to prevent the exposure operation during the rewinding operation.

It is further another object of the present invention to prevent the erroneous exposure due to errors in the film rewinding operation by forming a release prohibiting signal during the film rewinding operation by the motor drive device so as to keep the electromagnetic release circuit of the camera in the inoperative state.

Further other objects of the present invention will be clear from the following descriptions with reference to the accompanying drawings of the embodiments.

DESCRIPTION OF THE PREFERRED EMBODIMENTS

Figure 1:
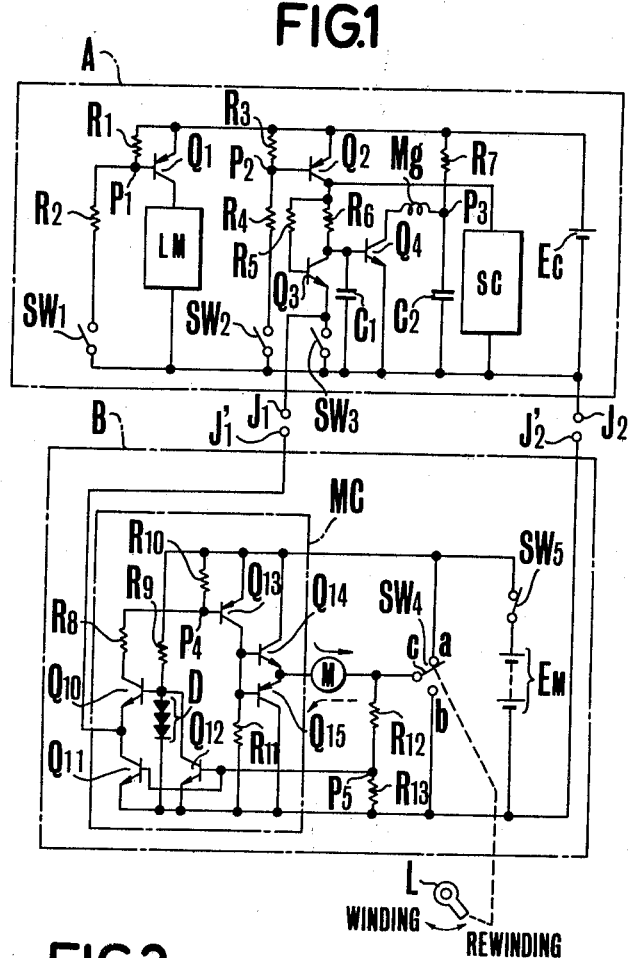
FIG. 1 shows the electrical circuit diagram of the motor drive electromagnetic release type camera having a safety device according to the present invention.

FIG. 1 shows the electrical circuit of a camera system embodying the present invention and composed of a camera control circuit A and a motor drive circuit B. In the camera control circuit A, and connected parallel to a battery Ec that serves as a power source, is a series circuit composed of resistors R1, R2 and a light measuring switch SW1 to be closed with the first step or stroke position of the shutter button. Also connected across the battery Ec is a series circuit composed of a PNP transistor Q1, and a conventional light measuring, calculating and display circuit LM; a series circuit of the resistors R3, R4 and the release switch SW2 to be closed with the second step or stroke position of the shutter button; a series circuit of the PNP transistor Q2, the resistor R6, the NPN transistor Q3 and the switch SW3. The latter is in engagement with the film winding mechanism, the shutter mechanism and so on so as to close upon completion of a photographic operation and open upon completion of the winding operation. Further connected across the battery Ec is a series circuit composed of the resistor R7, the first holding and driving magnet Mg and the NPN transistor Q4. The base of the transistor Q1 is connected to the connecting point P1 of the resistors R1 and R2, the base of Q2 to the connecting point P2 of the resistors R3 and R4, the base of Q3 to the collector of Q2 via the resistor R5 and the base of Q4 to the collector of Q3. A capacitor C1 is connected between the base of Q4 and the negative terminal of the power source Ec, a capacitor C2 is connected between the connecting point P3 (of the resistor R7 and the magnet Mg) and the negative terminal, and a shutter time control circuit SC is connected between the collector of Q2 and the negative terminal. The electromagnetic release circuit is composed of the magnet Mg, the transistor Q4 and the capacitor C2.

In the motor drive circuit B, through a switch SW5, a power source battery Em energizes a series circuit composed of the resistors R10, R8 and the NPN type transistors Q10, Q11; a series circuit composed of the resistor R9 and the diode D; a series circuit composed of a PNP transistor Q13 and a resistor R11; and a series circuit composed of an NPN transistor Q14 and a PNP transistor Q15. Also connected from the switch SW5 to ground is winding—rewinding selector switch SW4. The movable contact c of the changeover switch SW4 is connected to the emitter of the transistor Q14 via the motor M and to the negative terminal of the power source vattery Em via a series circuit of the resistors R12 and R13. The base of the transistor Q13 is connected to the connecting point of the resistors R10 and R8, while the base of the transistor Q11 and that of the NPN transistor Q12 connected in parallel to the diode D are connected to the connecting point P5 of the resistors R12 and R13.

The above camera control circuit A is built into the camera, while the motor drive circuit B is built into the motor drive or motor drive device. In case the motor drive is constructed separately from the camera body, the terminals J1, J2, J1' and J2' for connecting the both circuits A and B are arranged so as to correspond to each other on the camera and the motor drive device.

The device of FIG. 1 operates as follows.

In the normal photographic state, the operating lever L of the motor drive device is set for film winding, while the switch SW4 in operative engagement with the operating lever L is switched to the b contact of the switch SW4. If the shutter button is depressed when the film has been wound (switch SW3 open), the light measuring switch SW1 is closed at the first step or position and then the transistor Q1 starts to operate with the current running via the resistor R2 so as to supply current to the light measuring, calculating and display circuit LM. Thus, the photographer knows the photographic information from the display means in the camera finder.

When the switch SW2 is closed to the second position of the shutter button, the transistor Q2 starts to operate with the current running through the resistor R4 and then the transistor Q4 with the current running through the resistor R6 after a lapse of time determined with the resistor R6 and condenser C1. With the operation of the transistor Q4, the charge in the condenser C2 charged via the resistor R7 is discharged through the magnet Mg in about 10 ms.

Along with the current supply to the magnet Mg, the holding member which has prevented the shutter release operation is released and a series of operations such as the diaphragm closing, the mirror up operation and the running of the shutter curtain starts.

The current is supplied to the shutter time control circuit SC with the operation of the transistor Q2 so as to control the shutter in accordance with a predetermined time or the output of the light measuring and calculating circuit. This shutter control operation is well known and therefore its explanation is omitted.

After a picture is taken with the running of the shutter the switch SW3 is closed.

On the other hand, when the photographer closes the power source switch SW5 so as to start the motor drive device, a small current is supplied to the diode D via the resistor R9 so that the input of the transistor Q10 is biased with the voltage drop across the diode D. When the switch SW3 is closed after a picture is taken, the transistor Q10 is brought into the operative state and the transistor Q13 starts to operate with the current running through the resistor R8. Then, the transistor Q14 starts to operate, while the transistor Q15 of the opposite polarity is turned off so that the current runs through the motor M in the direction of the arrow so as to drive the motor forward.

With forward rotation of the motor M, the motor drive device winds the film via a gear train and winding coupler not shown in the drawing.

When the film has been wound, the switch SW3 in the camera control circuit A is opened so that the transistor Q10 as well as Q13 and Q14 in the motor drive circuit B are turned off. Although the motor M tries to rotate by virtue of its inertia, even if the transistor Q14 is off, the motor M stops quickly because the both terminals of the motor M are short circuited with the transistor Q13 off and Q15 on and thus the current runs along the reverse direction of the arrow in a dotted line.

When the shutter button continues to be depressed, the camera control circuit A carries out the next photographic operation, and when a picture is snapped, the switch SW3 is closed and the film is wound by the motor drive circuit B.

The above operation is continuously repeated as long as the shutter button remains depressed.

Generally, in the motor drive circuit, the single picture frame photographic circuit, the film termination detection circuit and so on are provided besides the above motor control circuit MC. However, their explanation is omitted here.

When the film has been completely exposed after repetition of the above photographic operation, the operating lever L is set for film rewinding so as to switch the switch SW4 in the motor drive circuit B to the contact a. Then a current flows through the resistors R12 and R13 because the contact c is connected to the positive terminal of the battery Em. Thus, the transistors Q11 and Q12 are turned on so that Q11 short-circuits the switch SW3 and Q12 short-circuits the diode D so as to stop the operation of the transistor Q10 during film winding.

When the transistor Q10 is turned off, the transistors Q13 and Q14 are also turned off so that transistor Q15 is made conductive and the current runs through the motor M in the direction of the dotted arrow so as to rotate the motor M backwards. The backward rotation of the motor drives the film winding mechanism to wind the film.

The transistor Q11 short-circuits the switch SW3 during winding of the film as mentioned. Hence, even if the release switch SW3 is closed by error and the transistor Q2 is operated, the release operation is prohibited because the transistor Q3 operates with the input current through the resistor R5 and the input terminal of the magnet driving transistor Q4 is grounded. Thus, mis-exposure during film winding can be avoided without fail.

Figure 2:
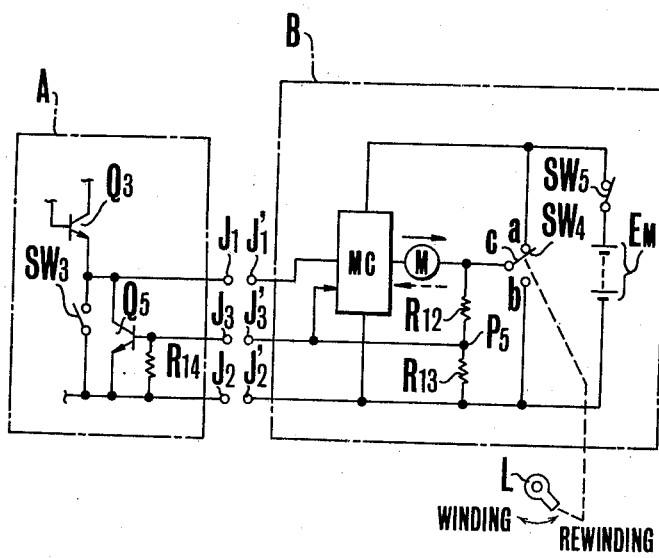
FIG. 2 shows a modified electrical circuit diagram according to the important part of the present invention.

FIG. 1 shows an embodiment in which the signal transmission terminals J1, J1' of the switch are used together so that the release prohibit control signal is transmitted from the motor drive circuit B to the camera control circuit A, while FIG. 2 shows the circuit diagram of another embodiment having a signal transmission terminal exclusively for the control signal.

In FIG. 2, the signal transmitting terminals J1–J3 and J1'–J3' in the camera control circuit A and the motor drive circuit correspond to each other. In the camera control circuit A, the transistor Q5 is provided in parallel to the switch SW3 and the resistor R14 is connected between the base and the emitter of the transistor Q5, whose collector is connected to the terminal J1, whose base to the terminal J3 and whose emitter to the terminal J2. In the motor drive circuit B, the terminal J1' is connected to the motor control circuit MC, the terminal J3' to the contact point P5 and the terminal J2' to the negative terminal of the power source battery Em.

When the switch SW4 is moved to the contact a in operative engagement with the operation control lever L so as to start the film winding operation, a current flows through the resistors R12 and R13, and the voltage produced between the terminals of the resistor R13 is applied to the base of the transistor Q5 via the terminals J3'–J3. Thus the transistor Q5 operates so as to short-circuit the switch SW3 and turn on the release operation prohibiting transistor Q3 so that even if the release switch SW2 is closed by error during film winding, the release operation is prohibited.

As explained above, in accordance with the present invention, the release prohibiting circuit serves for prohibiting the release operation of the electromagnetic release circuit of the camera with the signal from the motor drive circuit when the motor drive circuit is set in the film rewinding state. Hence, mis-exposure due to mis-release during film rewinding can be avoided without fail.

Further, when the motor drive device is constructed separate from the camera, using the terminal for transmitting the release prohibiting control signal from the motor drive circuit to the electromagnetic release circuit in common with the signal transmitting terminal, simplifies production and improves fidelity.

Although in the above embodiment the camera and the motor drive device are constructed separately, the same effect can be naturally obtained even if the motor drive device is built into the camera.

1. A motor drive device for use in a camera which has an electromagnetic release circuit to drive a camera initiation member by a release operation, first switch means to detect a completion of an exposure and shiftable from a first state to a second state, and an external terminal connected to said switch means, and to retain the release circuit in a non-operative state when said switch means is in the second switch state, comprising:
(a) a motor to effect a film wind-up operation and a film rewinding operation;
(b) a second terminal connectable to said external terminal;
(c) a motor drive circuit connected to said second terminal for forming a power supply path to the motor for a film wind-up in response to the second switch state of the switch means, and for forming a power supply path to the motor for a film rewinding in a film rewinding mode; and
(d) second switch means connected in parallel to said first switch means through the second terminal, said second switch means having a switch state equivalent to the second switch state of the first switch means in the film rewinding mode.

* * * * *